United States Patent
Gelli

(10) Patent No.: US 8,973,267 B2
(45) Date of Patent: Mar. 10, 2015

(54) EMBOSSING ROLLER AND METHOD FOR THE MANUFACTURING THEREOF

(75) Inventor: Mauro Gelli, Lucca (IT)

(73) Assignee: Fabio Perini, S.p.A., Lucca (IT)

( * ) Notice: Subject to any disclaimer, the term of this patent is extended or adjusted under 35 U.S.C. 154(b) by 824 days.

(21) Appl. No.: 12/225,072

(22) PCT Filed: Mar. 12, 2007

(86) PCT No.: PCT/IT2007/000180
§ 371 (c)(1),
(2), (4) Date: Sep. 12, 2008

(87) PCT Pub. No.: WO2007/105251
PCT Pub. Date: Sep. 20, 2007

(65) Prior Publication Data
US 2009/0114347 A1    May 7, 2009

(30) Foreign Application Priority Data
Mar. 15, 2006   (IT) .................... FI2006A0072

(51) Int. Cl.
| | | |
|---|---|---|
| *B21K 1/02* | (2006.01) | |
| *F16C 13/00* | (2006.01) | |
| *B31F 1/07* | (2006.01) | |
| *B23C 3/32* | (2006.01) | |
| *B23C 5/04* | (2006.01) | |

(52) U.S. Cl.
CPC ... *B31F 1/07* (2013.01); *B23C 3/32* (2013.01); *B23C 5/04* (2013.01); *B23C 2210/088* (2013.01); *B31F 2201/0717* (2013.01); *B31F 2201/0733* (2013.01); *B31F 2201/0738* (2013.01)
USPC ........... 29/895.3; 29/895.31; 492/35; 492/30; 492/33

(58) Field of Classification Search
USPC ............ 492/30, 28, 31, 33, 34, 36, 37, 20, 1; 29/895.3, 895.31, 895.33, 895; 407/23, 407/26
See application file for complete search history.

(56) References Cited

U.S. PATENT DOCUMENTS

| | | | | |
|---|---|---|---|---|
| 1,541,977 | A * | 6/1925 | Lorenz .......................... | 162/117 |
| 2,765,682 | A * | 10/1956 | Wiley ........................... | 76/107.1 |
| 2,775,911 | A * | 1/1957 | Richardson et al. .............. | 72/75 |
| 2,864,153 | A * | 12/1958 | Mahan ........................... | 407/26 |
| 3,005,364 | A * | 10/1961 | Broderick .................... | 76/107.1 |

(Continued)

FOREIGN PATENT DOCUMENTS

| | | |
|---|---|---|
| IT | 1 222 255 B | 9/1990 |
| IT | 1 222 256 | 9/1990 |

(Continued)

*Primary Examiner* — Essama Omgba
(74) *Attorney, Agent, or Firm* — Breiner & Breiner, L.L.C.

(57) ABSTRACT

A method for obtaining an incision in an embossing roller using a hob to provide protuberances that are rounded on top and which improve the quality of the embossed material and reduce the wear of the mechanical components of the embossing units. The shape of the protuberances is obtained by machining the cylindrical surface of the roller placed between the tailstocks of the lathe using a hob that has teeth, the profile thereof being complementary to the cross-section of the protuberances. A portion of the hob with the teeth generates the grooves that define the side faces of the protuberances. The grooves between the teeth of the hob have a profile that is curvilinear in a cross-sectional view. With a double pass at two different inclinations of the surface of the roller, the protuberances of FIGS. 5 and 6 are generated.

7 Claims, 11 Drawing Sheets

(56) References Cited

U.S. PATENT DOCUMENTS

| | | | | | |
|---|---|---|---|---|---|
| 3,060,515 | A | * | 10/1962 | Corbett | 264/284 |
| 3,073,690 | A | * | 1/1963 | Louis et al. | 451/56 |
| 3,111,865 | A | * | 11/1963 | Wildhaber | 76/101.1 |
| 3,183,910 | A | * | 5/1965 | Patterson | 604/381 |
| 3,323,983 | A | * | 6/1967 | Palmer et al. | 162/362 |
| 3,715,789 | A | * | 2/1973 | Johnson | 407/26 |
| 3,782,041 | A | * | 1/1974 | Batorski | 451/123 |
| 3,893,795 | A | * | 7/1975 | Nauta | 425/403 |
| 4,329,096 | A | * | 5/1982 | Herscovici | 409/15 |
| 4,663,721 | A | * | 5/1987 | Herscovici | 700/160 |
| 4,841,611 | A | * | 6/1989 | Kusaba et al. | 492/31 |
| 4,959,275 | A | * | 9/1990 | Iguchi et al. | 428/603 |
| 4,978,583 | A | * | 12/1990 | Wakui et al. | 428/600 |
| 5,096,527 | A | | 3/1992 | Biagiotti | |
| 6,032,712 | A | | 3/2000 | Biagiotti | |
| 6,053,232 | A | | 4/2000 | Biagiotti | |
| 6,151,778 | A | * | 11/2000 | Woolf et al. | 29/893.32 |
| 6,151,941 | A | * | 11/2000 | Woolf et al. | 72/102 |
| 6,173,496 | B1 | * | 1/2001 | Makoui et al. | 29/895.21 |
| 6,245,414 | B1 | | 6/2001 | Biagiotti | |
| 6,470,945 | B1 | | 10/2002 | Biagiotti | |
| 6,578,617 | B1 | | 6/2003 | Biagiotti | |
| 6,681,826 | B1 | | 1/2004 | Biagiotti | |
| 6,755,928 | B1 | | 6/2004 | Biagiotti | |
| 6,887,349 | B2 | * | 5/2005 | Ruthven et al. | 162/114 |
| 7,297,226 | B2 | * | 11/2007 | Schulz | 162/117 |
| 7,322,917 | B2 | * | 1/2008 | Betti et al. | 492/30 |
| 7,326,322 | B2 | * | 2/2008 | Ruthven et al. | 162/362 |
| 7,678,034 | B2 | * | 3/2010 | Wilhelm | 492/33 |
| 7,703,761 | B2 | * | 4/2010 | Shiraki | 271/109 |
| 2002/0155257 | A1 | * | 10/2002 | Schultz et al. | 428/195 |
| 2003/0008109 | A1 | | 1/2003 | Basler et al. | 428/156 |
| 2005/0138981 | A1 | * | 6/2005 | Wilhelm | 72/197 |
| 2008/0248206 | A1 | * | 10/2008 | Della Torre et al. | 427/331 |
| 2009/0185838 | A1 | * | 7/2009 | Aruga et al. | 399/286 |
| 2010/0025515 | A1 | * | 2/2010 | Gelli et al. | 242/521 |
| 2010/0150617 | A1 | * | 6/2010 | Maeda et al. | 399/284 |
| 2010/0251864 | A1 | * | 10/2010 | Rose et al. | 83/13 |

FOREIGN PATENT DOCUMENTS

| | | |
|---|---|---|
| JP | 60-52213 A | 3/1985 |
| WO | WO 03/082559 A1 | 10/2003 |
| WO | WO 2004/002727 A1 | 1/2004 |
| WO | WO 2005/011970 A1 | 2/2005 |
| WO | WO 2005/077649 A1 | 8/2005 |
| WO | WO 2005/113226 A1 | 12/2005 |

* cited by examiner

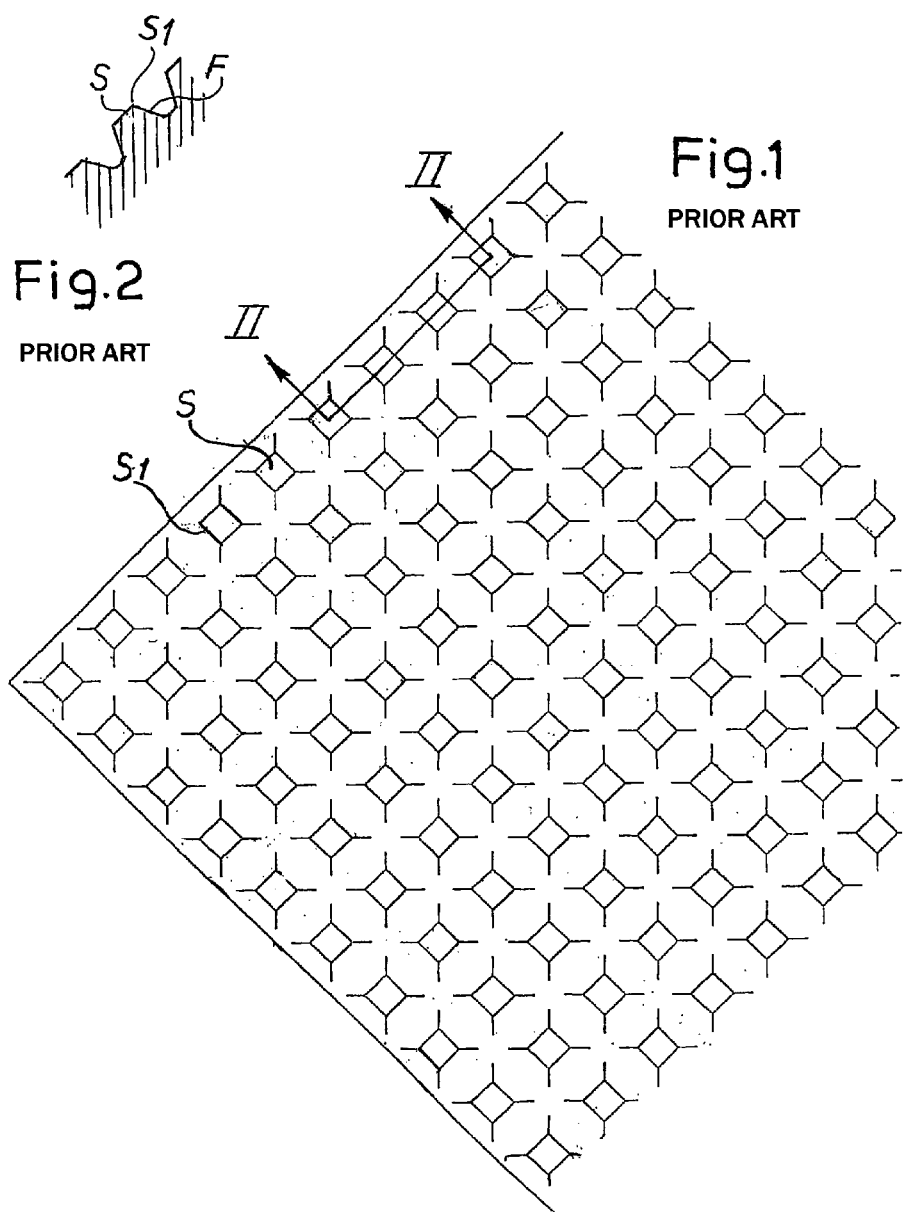

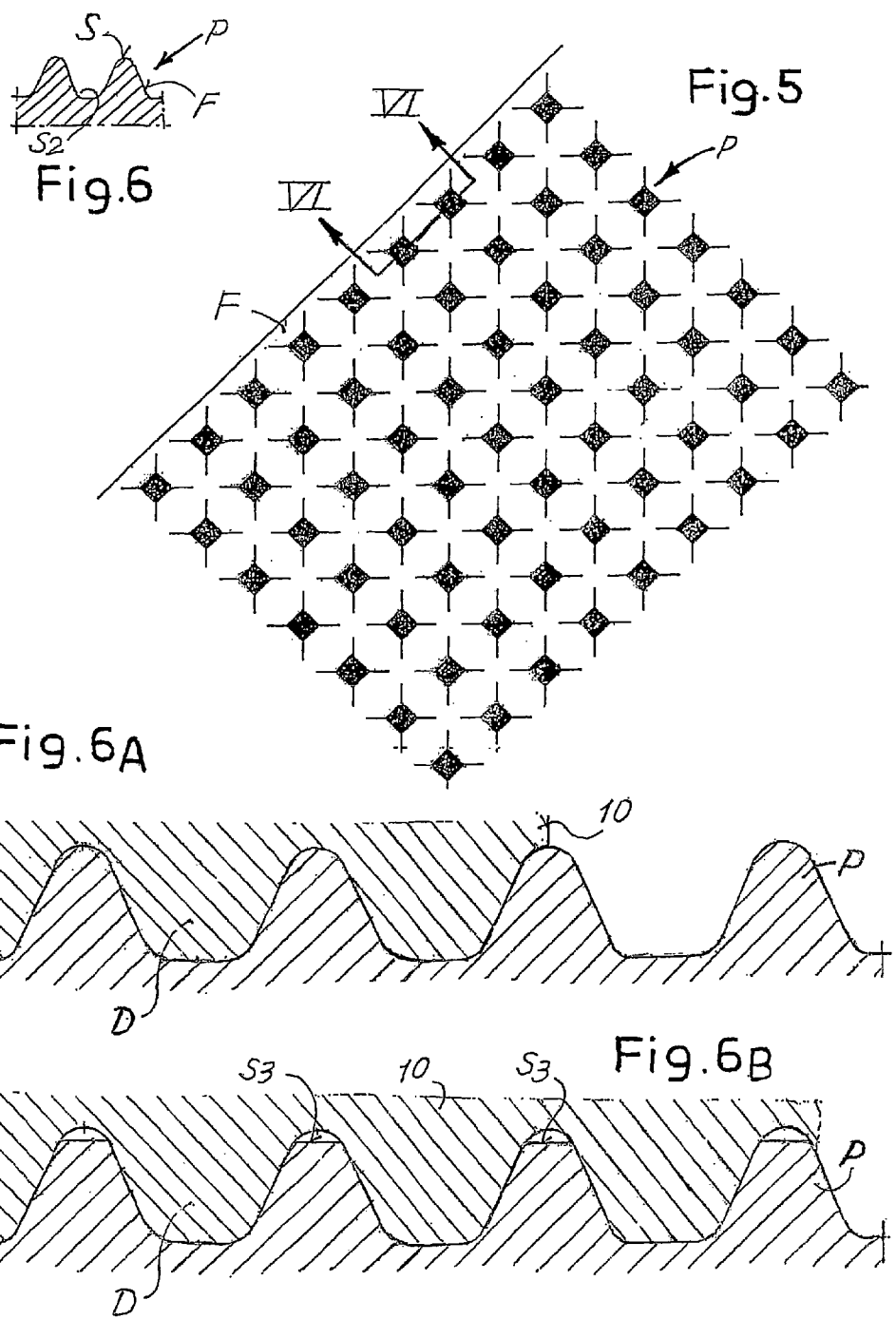

EMBOSSING ROLLER AND METHOD FOR THE MANUFACTURING THEREOF

TECHNICAL FIELD

The present invention relates in general to embossing rollers, and in particular to embossing rollers for manufacturing paper and specifically for embossing so-called "tissue paper", used for the production of toilet paper, kitchen wipes, paper handkerchiefs and serviettes or similar products.

The invention also relates to an embossing unit comprising one or more embossing rollers and possible pressure rollers.

STATE OF THE ART

For processing weblike products, in particular but not exclusively cellulose fibres-based weblike materials, such as paper, tissue paper or crepe paper and the like, so-called embossing units are frequently used, in which the weblike material is subjected to an action of permanent deformation. For this purpose, the weblike material is passed between two embossing rollers or else between an embossing roller and a pressure roller, normally coated with elastically yielding material, such as rubber or the like.

The embossing roller has a series of protuberances of various shapes, which cause the deformation of the weblike material. When the embossing roller co-operates with a pressure roller coated with yielding material, the deformation of the weblike material is obtained by causing the weblike material to pass in the nip formed by the embossing roller and by the pressure roller and pressing said rollers against one another so that the protuberances or projections of the embossing roller penetrate into the elastically yielding layer with which the pressure roller is coated.

The projections or protuberances of the embossing roller can take various shapes according to their purpose, which can be of a technico-functional and/or aesthetic nature. In fact, in general embossing can be used for modifying the technical and functional characteristics of the product, for example to make it thicker, more absorbent, softer, or also to apply a decoration on the weblike material.

An embossing unit of the tip-to-tip type (i.e., in which two layers are separately embossed and joined together with the protuberances of one layer at least in part corresponding to the protuberances of the other) is described in U.S. Pat. No. 5,096,527. Other tip-to-tip embossing units are described in U.S. Pat. Nos. 6,245,414, 6,032,712, and 6,053,232. A bivalent embossing unit, which is able to work with the tip-to-tip technique and with the nested technique, is described in U.S. Pat. No. 6,578,617. The nested embossing technique envisages embossing separately two plies and joining them so that the protuberances of the one enter the empty spaces between the protuberances of the other. Another bivalent embossing unit is described in U.S. Pat. No. 6,470,945. Other embossing units based upon other techniques are described in U.S. Pat. Nos. 6,755,928 and 6,681,826, and in the international publications Nos. WO-A-03/082559, WO-A-2005/011970, WO-A-2005/077649, and WO-A-2004002727.

Embossing rollers can present protuberances of various shapes and having different functions, for example functions of decoration of the weblike material and functions of modification of the technico-functional characteristics of the material itself. In other cases, it is possible to envisage distinct embossing units arranged in series along the path of the weblike material to obtain a double action in sequence on one and the same weblike material.

Of particular importance in the context of the present invention are the embossing rollers provided with protuberances with geometrical distribution and having a simple shape, which have the function of bestowing a basic embossing, the purpose of which is prevalently of a technico-functional nature.

Normally, in this case the protuberances of the embossing roller have a geometrically simple shape, typically that of a truncated cone or a truncated pyramid. Examples of embossing rollers provided with protuberances with these configurations are described in some of the publications mentioned above.

Described in WO 2005/113226 and in US-A-2003/0008109 are embossing rollers provided with protuberances having the shape of a truncated cone, i.e., with a circular or elliptical cross section. The tops of these protuberances have a shape that may be rounded to obtain particular effects on the weblike material. Specifically, rounding of the terminal portion of the protuberances enables a surface effect of: greater softness to be obtained on the embossed paper material and a lower mechanical stress of the fibres.

The protuberances with this conformation are obtained normally via a chemical treatment and/or via the use of a laser. The processing operations that involve these techniques are particularly long and costly. In some cases, the process is performed by permanent deformation using a wheel that is made to pass repeatedly over the originally cylindrical surface of the roller.

Much faster and more economical processing operations for the production of the embossing rollers are achieved using chip removal tools, known as hobs, of a type substantially equivalent to the ones commonly used for cutting gears. In the Italian patents Nos. 1,222,255 (patent application No. 9422A/88, filed on Jun. 6, 1988) and 1,222,256 (patent application No. 9423A/88, filed on Jun. 6, 1988), machining techniques of this type are described. The roller to be machined is mounted on a lathe and brought into rotation. The incisions are made thereon using one or more hobs.

The nature of the production process is such that the protuberances generated using the hob necessarily have the shape of a truncated pyramid. Said protuberances, in fact, are obtained by the intersection of series of helical grooves. In practice, in a first step the hob generates a plurality of helical grooves having a given inclination. In the subsequent step, the hob generates a second series of helical grooves that intersect the first series. In the intersection of the helical grooves, protuberances are generated having the shape of a truncated pyramid. Machining may also be carried out with a double tool in a single step.

The production cycle currently adopted for producing these embossing rollers envisages a preliminary grinding of the cylinder before machining by chip removal using the hob. Once chip-removal machining has been carried out, with the formation of the two series of helical grooves intersecting one another, the roller is subjected to a new grinding operation to bring the outer diameter of the roller itself, defined by the tops of the protuberances, to the desired dimension. In fact, the height of the protuberances generated by the double pass of the hob is normally greater than the final height that it is desired to obtain. The final grinding serves not only to reach the required diameter but also to eliminate possible burrs or residue of swarf from the tops of the protuberances.

Once grinding has been carried out, the roller is subjected to a treatment of hardening and protection against oxidation, for example, a process of chrome-plating or nitriding.

The grinding process following the hob machining of the embossing roller lengthens considerably the machining time and involves an increase of the cost for the production of the individual embossing roller. This final grinding operation produces, on the top of the protuberances, surfaces resembling flattened areas. In the case of protuberances having the shape of a truncated cone, these flattened areas are circular in shape, whereas, in the case of protuberances having the shape of a truncated pyramid, the flattened areas are quadrangular in shape. In any case, the top surfaces have a perimetral cutting edge; in particular, in the case of protuberances having the shape of a truncated pyramid this presents sharp edges at the side edges of the pyramid. The top surface and its perimeter edges are the first elements of the protuberance that work on the paper in the action of compression—against the elastically yielding roller—and in that of deformation of the fibres of the weblike material. Since the consistency and strength of the weblike material are relatively low, the pressures that can be exerted to deform it are also relatively low in order not to tear or break down too much the fibres of the weblike material itself, with consequent loss of mechanical characteristics of strength.

In the case where it is desired to obtain glued as well as embossed multiply products at least some of the protuberances with which the embossing rollers are provided are used also for receiving the glue on at least some of the embossed protuberances created on the weblike material. According to known techniques, in fact, once the weblike material has been deformed, at least some of the embossed protuberances, which are advantageously still engaged by the corresponding protuberances of the embossing roller that has generated them, are brought into contact with a glue distributed, for example, by a roller for distributing glue arranged adjacent to the embossing roller. The distributing roller has on the outer cylindrical surface a very thin layer of glue, which, when grazed by the embossed weblike material, is picked up by the top surface of the embossed protuberances. The quantity of glue applied to the layer of paper is a function of the thickness of the layer of glue and, to a greater extent, of the width of the top surface of the embossed protuberances. In the case of traditional protuberances having the shape of a truncated cone or of a truncated pyramid, this top surface is invariable and defined by the final machining operation of grinding to which the protuberances of the embossing roller that has generated them on the weblike material had been subjected.

The embossing rollers obtained by machining using a hob and subsequent grinding always present protuberances all of the same height in so far as, in the current state of the art, it would be very difficult or even impossible to perform a selective grinding of the protuberances themselves. In other words, once the incision is completed, the entire cylindrical surface of the roller is ground and brought to the same diameter. Consequently, all the protuberances of the embossing roller have the same height.

OBJECTS AND SUMMARY OF THE INVENTION

An object of the present invention is to provide a manufacturing process or method for producing embossing rollers that will enable maintenance of the advantages of incision obtained using a hob, i.e. a chip-removal machining, as compared to chemical, laser or other methods of incision, with a further reduction in the costs and production times.

An object of a preferred embodiment of the invention is to improve the characteristics of the embossing roller obtained by chip-removal machining, enabling an embossed paper product to be obtained having better mechanical characteristics, as well as a better feel.

Basically, according to one embodiment of the invention a method is provided for manufacturing an embossing roller provided with a plurality of protuberances arranged according to a geometrical distribution, each having substantially the shape of a truncated pyramid with a major base closer to the axis of the roller and a top surface further away from the axis of the roller, and side surfaces generated by chip-removal using a hob, wherein chip-removal machining of the top surfaces of the protuberances is completed by the hob, without further subsequent grinding. Typically, since they are obtained using a chip-removal hob, the side surfaces or faces of the protuberances have a plane development.

In a possible embodiment, the protuberances are generated by at least one first pass and one second pass of a hob over the surface of the roller whilst said roller is kept in rotation, to generate a first series of helical grooves during said first pass and a second series of helical grooves during said second pass, the helical grooves of the first and second series intersecting one another to generate said protuberances. It is also possible to envisage that each series of grooves will be obtained by repeated passes of the hob.

In a possible embodiment, the top surfaces of the protuberances are generated by the interaction of the roller with the grooves of the hob, each top surface being generated by chip-removal using said hob. According to another embodiment of the invention, some or all of the protuberances can be obtained so that at least a portion of the top surface of the protuberances is generated by the interaction between the roller and the flanks of the teeth of the hob, without the bottom lands of the grooves between contiguous teeth of the hob coming into contact with the material of the roller, so that in this case the protuberances thus obtained have a central area of the top surface that is machined in the step of grinding that precedes incision using the hob.

However, in either case the grinding operation following the incision using the hob is avoided.

In general, the embossing roller will thus have protuberances having the shape of a truncated pyramid, in which the top surface of each protuberance is radiused to at least some of the faces or respective side surfaces via curved and convex portions of surface. Preferably the curved and convex surface, i.e., the crowned or rounded surface portion of radiusing, is provided in an area corresponding to at least two opposed side faces and preferably in an area corresponding to all of the side faces. In this way, not only is a simpler, faster and more economical machining of the roller obtained, but also a roller with which it is possible to obtain a more delicate embossing and with fewer localized stresses of the paper fibres, with advantages in terms of mechanical resistance and characteristics of feel. Indeed sharp edges, which in traditional rollers and in particular in ones obtained by chip-removal are formed in the intersection between the top surface of the protuberance and the side surfaces or faces thereof, are partly or entirely eliminated. Also eliminated are the acute vertices, i.e., the points of intersection between concurrent edges, for example between the sharp edge defined by the intersection of two plane side faces and the two consecutive edges of the top surface.

Elimination or reduction of the sharp edges and of the acute vertices of the protuberances affords advantages also in terms of wear of the embossing unit. In fact, there is a reduction of wear of the pressure rollers, which are normally coated with rubber and which co-operate with the embossing rollers. The reduction of the edges and of the acute vertices also affords an advantage as regards the treatments to which the roller is subjected after incision. In fact, said rollers are chrome-plated. The chrome deposits in a non-uniform way on the surface of the rollers and concentrates more on the areas with smaller radius of curvature and thus in particular on the edges and on the vertices of the protuberances. With the rounded protuberances according to the invention there is hence obtained a reduction in the lack of uniformity of the thicknesses of chrome-plating, which contributes to rendering any further grinding operation superfluous.

Preferably, but not necessarily, all the side surfaces of each protuberance will be radiused to the top surface by means of curved and convex surface portions, i.e., with rounded surfaces. This reduces the mechanical stresses on the paper during the process of embossing to a minimum and improves the final characteristic of the product in terms of strength and feel.

According to an advantageous embodiment, the protuberances are generated at least two distinct heights on one and the same roller via two or more passes of at least one hob. The hob will have, in this case, grooves of different depth between the teeth: shallower ones to generate the lower protuberances and deeper ones to generate the higher protuberances. The absence of the subsequent grinding step enables to obtain by means of chip-removal machining a roller with protuberances of different heights, and preferably with some at least of the protuberances that have at least partially crowned (i.e., curved and convex) top surfaces. Preferably, also in the case of protuberances of different heights, all the protuberances will have crowned top surfaces, i.e., with at least portions of surface curved and convex, which are radiused to the flanks, i.e., to the side surfaces or faces of the protuberances themselves.

According to a further aspect, the invention relates to an embossing roller comprising a plurality of protuberances arranged according to a geometrical distribution, each having substantially the shape of a truncated pyramid with a base closer to the axis of the roller and a top surface further away from the axis of the roller, and side surfaces generated by chip-removal machining, in which at least part of each of said top surfaces of said protuberances is obtained with two passes of a hob and in which the top surfaces machined using said hob are not subjected to subsequent chip-removal machining operations.

According to yet a further aspect, the invention relates to an embossing unit comprising at least one embossing roller as described above and/or obtained with the method defined above, and at least one pressure roller co-operating with said embossing roller. Preferably, the embossing unit also has a gluing assembly comprising a roller for applying or distributing glue, for gluing two or more layers to one another, at least one of which is embossed.

According to a further aspect, also forming the subject of the invention is an embossing roller comprising a plurality of protuberances having the shape of a truncated pyramid, generated by chip-removal machining, each protuberance with the shape of a truncated pyramid having a plurality of side faces and a top surface, wherein the top surface of at least some of said protuberances is radiused to at least some respective side faces via curved and convex portions of said top surface.

Preferably, the top surface of all the protuberances is radiused to at least some respective side faces via curved and convex portions of top surface. In an improved embodiment, the top surface of at least some of said protuberances and preferably of all of the protuberances is radiused to all the respective side faces via convex curved portions of surfaces.

The invention also relates to an embossing roller comprising a plurality of protuberances having the shape of a truncated pyramid, generated by chip-removal machining, each protuberance with the shape of a truncated pyramid having a plurality of side faces and a top surface, wherein the top surface of at least some of said protuberances has at least one crowned portion.

Also forming the subject of the invention is an embossing roller comprising a plurality of protuberances of a geometrical shape, preferably obtained by chip-removal, of different heights and with at least partially rounded top surfaces. In other words, the top surfaces both of the protuberances of greater height and of those of smaller height, have at least one curved and convex, i.e., crowned, portion. The protuberances preferably have the shape of a truncated pyramid with quadrangular base, and preferably the protuberances of greater height also have a cross section at the base greater than the protuberances of smaller height. For example, the protuberances of greater height can be distributed at the vertices of a structure with quadrangular meshes and preferably square meshes. Preferably, located at the centre of each mesh is a protuberance of smaller height and, in a possible embodiment, four protuberances of smaller height intersect the sides of the quadrangular or square mesh. The protuberances of smaller height can have different cross-sectional shapes, for example square or elongated rectangular shapes.

According to an advantageous embodiment, the protuberances of greater height have a square cross section, with a base having a side which is twice as long as that of the base of the protuberances of smaller height. Said protuberances, if they have shapes that are different from one another, may be: ones of a first type with square cross section, the base side of which is equal to half the base side of the protuberances of greater height; and ones of a second type with rectangular cross section, the larger base side of which is equal to the base side of the protuberances of larger dimensions and the smaller base side of which is equal to half the base side of the protuberances of larger dimensions.

BRIEF DESCRIPTION OF THE DRAWINGS

The invention will be better understood from the description and the attached plate of drawings, which shows a practical non-limiting embodiment of the invention. More in particular, in the plate of drawings:

FIG. 1 is a plane development of a portion of an embossing roller machined according to the traditional technique using a hob and subsequent grinding;

FIG. 2 is a local cross section according to II-II of FIG. 1;

FIG. 5 is a schematic representation of a plane development of a roller machined according to the invention;

FIG. 6 is a local cross section according to VI-VI of FIG. 5;

FIG. 6A is a local cross section similar to the cross section of FIG. 6, but with the indication of the profile of the hob in the machining step;

FIG. 6B is a cross section similar to that of FIG. 6A, with a smaller penetration of the hob in the material of the roller;

DETAILED DESCRIPTION OF THE INVENTION

FIGS. 1 and 2 show the plane development and cross-sectional view of a roller machined with a double pass of a hob and subsequently ground, according to what is described in the Italian patents Nos. 1,222,255 and 1,222,256.

Figure 3:
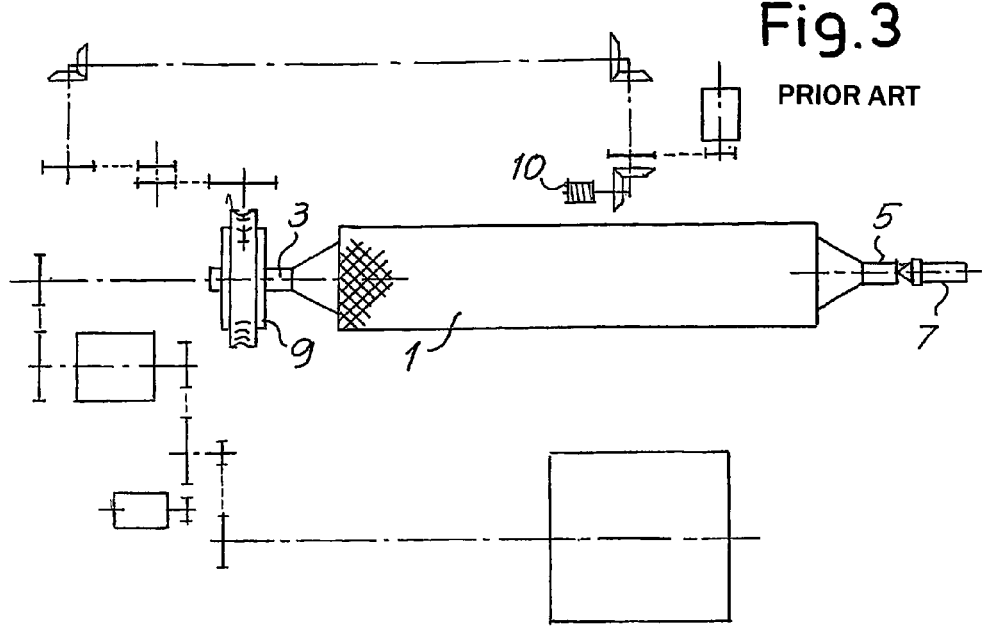
FIGS. 3 and 4 are kinematic diagrams of equipment for machining the rollers with one or two hobs.

In order to carry out this incision, the roller 1, which has previously been ground, is set with the shanks 3 and 5 between the tailstock 7 and the spindle of a lathe, to which the spindle is fixed with respect to a gear 9, which imparts the motion of rotation through a gear transmission of a known type. The principal members of the lathe are represented schematically in FIG. 3 and are not described in greater detail, since they are known to those skilled in the art.

Designated by 10 is a hob that carries out, on the cylindrical surface of the previously ground roller 1, with two or more successive passes and two different inclinations, a double series of helical grooves, which by intersecting with one another generate protuberances having the shape of a truncated pyramid. The grooves are obtained by machining carried out with the cutting edges of the hob and removal of material from the roller.

Figure 4:
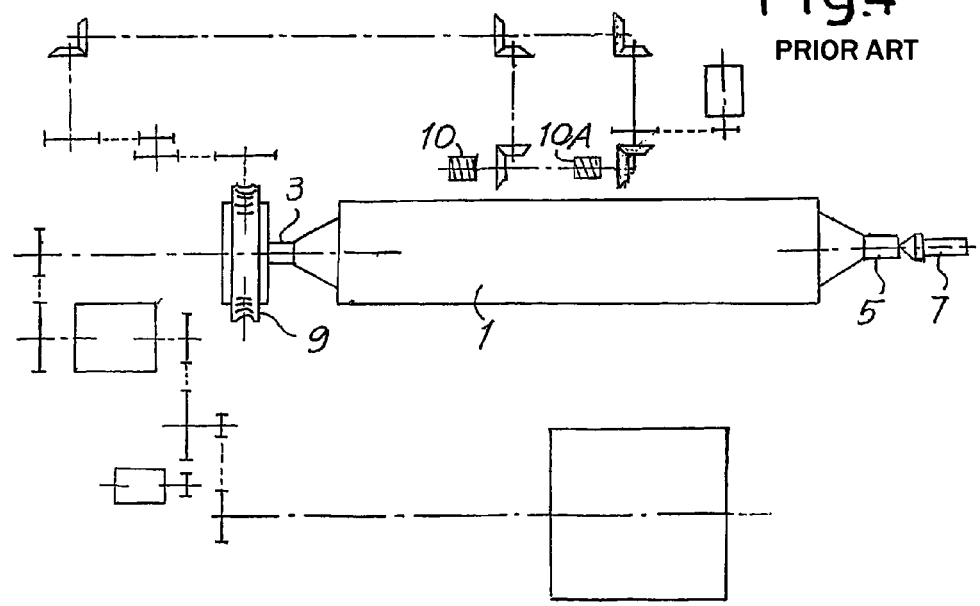

In the diagram of FIG. 4, the same roller 1 is machined with two hobs 10, 10A in sequence. According to the traditional technique, the roller incised with this equipment undergoes grinding to bring the protuberances formed by the intersection of the helical grooves generated by the hobs 10, 10A to the desired size. The result of this method of treatment is the one schematically illustrated in FIG. 1 and in the cross section of FIG. 2. The protuberances designated by P have the shape of a truncated pyramid with square cross section (in the example), with larger bases closer to the axis of the roller and approximately plane top surfaces that are joined to the side faces F of the respective protuberance at the edges S1. This plane top face is machined by the grinding wheel, and the edges S1 are generated by the intersection between the plane side surfaces or plane faces F of the protuberances having the shape of a truncated pyramid, generated by the hob 10, with the surface of envelope on which the grinding wheel that carries out grinding moves. In actual fact, as a result of the cylindrical shape of the side surface of the roller and of the cylindrical shape of the grinding wheel, the top surface will not be exactly plane, but in what follows will be assumed as being a plane surface, where (in the context of the present description and annexed claims) by "plane" is meant a surface that, with its own geometrical shape, approaches a plane even though it is in actual fact generated by the intersection of the cylindrical surface of the roller 1 with the surface of movement of the grinding wheel.

This machining process is particularly long on account of the need to carry out the grinding operation after incision using one or more hobs 10, 10A. Furthermore, this operation generates the sharp edges S1 on the embossing roller. These sharp edges act on the paper or other material embossed by the roller thus obtained to generate a very intense localized stress on the cellulose fibres that make up the paper, or in general on the embossed material. This can cause a localized damage to the embossed material and also generates a surface that has a particularly rough feeling.

Figure 6C:
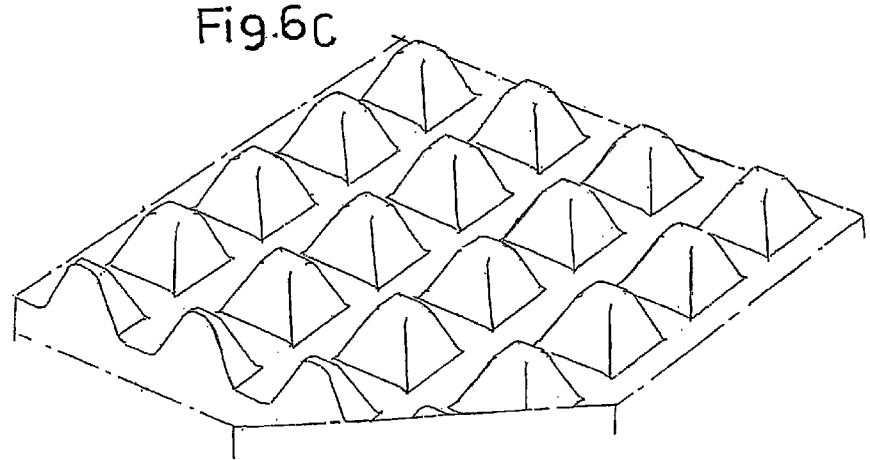
FIG. 6C is a perspective view of a plane developed of a portion of the roller of FIG. 6.

FIGS. 5, 6, 6A illustrate how, instead, the embossing roller can be machined with the method according to the present invention. Numbers that are the same designate parts that are the same as, or equivalent to, those of FIG. 1. FIG. 5 again illustrates a plane development of a portion of the cylindrical surface of the embossing roller 1, which has protuberances P having the shape of a truncated pyramid. As may be seen in the local cross section of FIG. 6, these protuberances P having the shape of a truncated pyramid again have side faces F formed by the intersection of the grooves generated by the hob 10 or by the pair of hobs 10, 10A. In the example shown, they are again protuberances having the shape of a truncated pyramid with square base, but it must be understood that the protuberances can also have other shapes, consistent with the use of the technique of incision using a hob. For example, the protuberances could have the shape of a truncated pyramid with rectangular, rhomboidal or hexagonal base, obtained with a corresponding number of passes of the hob. FIG. 6C shows a perspective view of a plane development of a portion of the incised roller corresponding to FIGS. 5 and 6.

Unlike what occurs in the traditional technique of incision (FIGS. 1 and 2), the top surface of each protuberance P no longer has an approximately plane surface portion connected with sharp edges to the side faces F. Rather, the top surface, again designated by S, is here completely rounded, i.e., it is radiused to the side faces F without generation of sharp edges (FIG. 6C). The bottom of the grooves corresponding to the base of the truncated pyramid forming the protuberances P has edges S2 with a wide radius of curvature.

This shape of the protuberances P is obtained by machining the cylindrical surface of the roller 1 that is placed between the tailstocks of the lathe using a hob that has teeth, the profile of which in cross-sectional view is complementary to that of the cross section of the protuberances P illustrated in FIG. 6. FIG. 6A shows schematically in cross-sectional view a portion of the surface of the roller 1 with protuberances P in the machining step and a portion of the hob 10 with the teeth D that are generating the grooves that define the side faces of the protuberances P.

As may be noted in FIG. 6A, the grooves between the teeth D of the hob 10 have a profile that is curvilinear in a cross-sectional view. With a double pass of this tool according to two different inclinations on the surface of the roller 1 the protuberances P of FIGS. 5 and 6 are generated, with top or front surfaces that, are rounded. The top lands of the teeth D penetrate into the material that forms the roller 1 generating the grooves or channels with the bottom rounded in S2.

In this specific example of embodiment, then, each protuberance P has side surfaces or faces F and a top surface S all generated by chip removal from the original surface of the roller 1 by means of the teeth D of the hob 10. The entire surface thus generated has been machined by the hob. It is not, on the other hand, ruled out that the hob 10 is not sunk with its teeth completely into the material of the starting roller, so that the top surfaces of the protuberances P are machined in a perimeter area by the hob 10, whilst the central area is not further machined, and it will thus be formed in part by a portion of the surface of the roller 1 machined by the grinding operation that precedes incision on the lathe. An example of machining according to this modality is represented schematically in FIG. 6B.

Designated in FIG. 6B by S3 is an intermediate top surface portion of the protuberance P, on which the hob 10 does not act, the bottom land of which between the teeth D does not touch the material of the roller. This central area S3 of the top surface is surrounded perimetrally by a portion of top surface that is, instead, machined by the flanks of the teeth D of the hob 10 and thus has a curved shape and forms a radiusing area radiused to the side surfaces or faces F of each protuberance.

In an embodiment of the invention the dimensions of the protrusions P and the distance between adjacent protrusions P is such that in a sectional plane containing the axis of the roller and developing orthogonal to the side surfaces of the protrusions (such as the sectional plane indicated at VI-VI in FIG. 5) the "filled area" is less than the "empty area", i.e. the sectional area of the protrusion P is less than the sectional area of the space generated by the tooth D of the hob between two adjacent protrusions.

In a preferred embodiment the bottom of the empty space or channel between adjacent protrusions P has a curved surface as shown e.g. in FIGS. 6A and 6B. Said curved surface is concave and is formed by the convex front surface of the teeth D of the hob. Preferably, the bottom surface of the empty space between adjacent protrusions has a flat portion. This flat portion is in actual fact cylindrical in shape and co-axial to the cylinder. Said flat portion is radiused to the flat side surfaces of the protrusions by means of the above mentioned curved surface.

With a roller incised as illustrated in FIGS. 6-6C it is possible to obtain further advantages with respect to traditional rollers (FIGS. 1 and 2) and in particular an increase in the diameter of the rolls of paper embossed using said rollers given the same length of wound paper. This advantage, which basically amounts to an increase in the volume or bulk of the product given the same amount of wound material, is achieved also with respect to embossings obtained with chemically etched or laser-etched rollers. In this case, there is added also the advantage that the machining of the roller by chip removal using a hob is much faster and hence more economical, with a reduction in the machining times by even more than 50% with respect to the techniques of incision (laser or chemical etching) traditionally used to obtain rounded tips.

Figure 7:
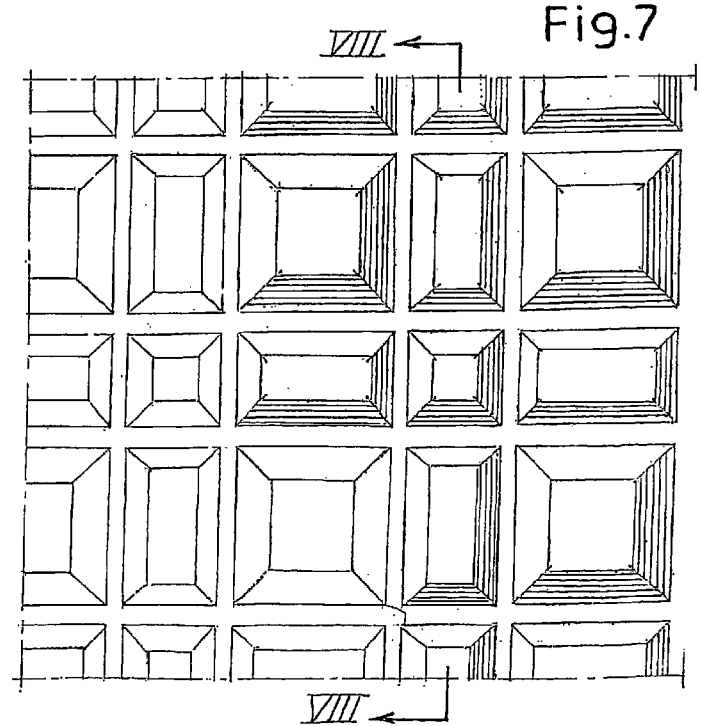
FIG. 7 is an enlarged plane developed portion of a surface of an embossing roller with different patterns of incision.
Figure 7A:
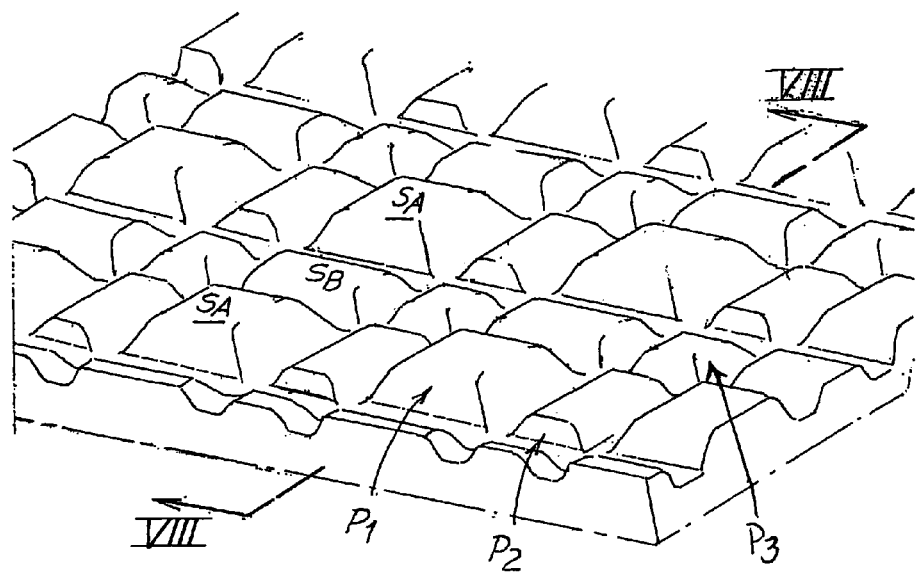
FIG. 7A is a schematic perspective view of the plane development of FIG. 7.
Figure 8:
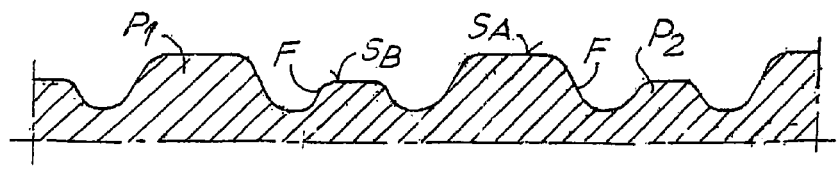
FIG. 8 is a cross section according to VIII-VIII of FIG. 7.
Figure 12:
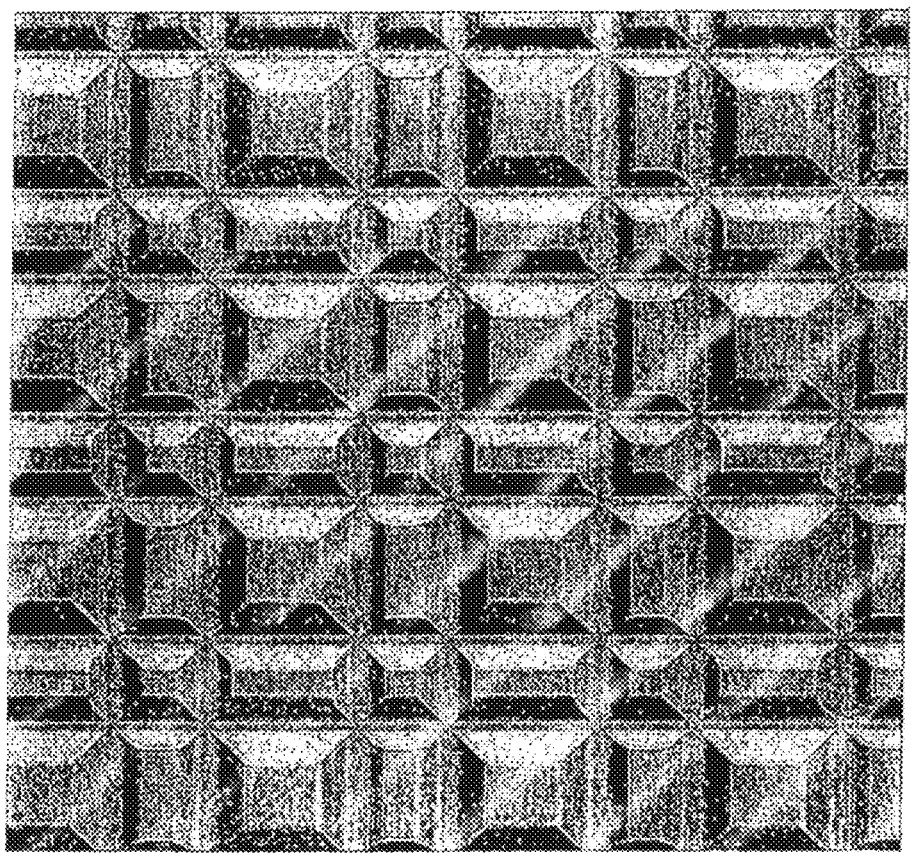
FIGS. 12 and 13 are 3-D computer representations similar to those of FIGS. 7 and 7A.
Figure 13:
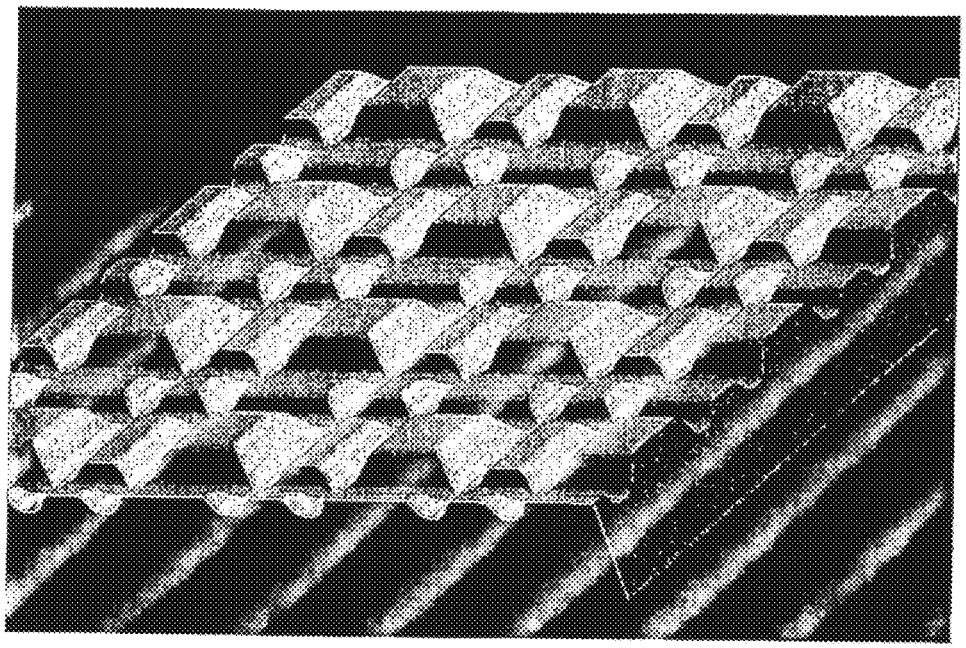

With an appropriate configuration of the hob it is also possible to obtain, directly by chip removal using the hob, a cylindrical surface of the roller 1 provided with protuberances of variable height. A solution of this sort is shown schematically in FIGS. 7, 7A, 8, 12 and 13. FIG. 7 shows a plane development of a portion of roller 1 machined using a hob that has a profile with teeth of different heights, where FIG. 8 is a cross section according to VIII-VIII of FIG. 7 and FIG. 7A shows a perspective view of the plane developed portion of the incised roller, shown in plan view in FIG. 7. FIGS. 12 and 13 show, in a representation obtained using a three-dimensional modelling software, views similar to those of FIGS. 7 and 7A, respectively. It may be noted, in this embodiment, that the protuberances (represented in FIG. 7 only schematically by means of lines that in actual fact do not correspond to sharp edges) have two different heights and three different shapes in plan view. More in particular, there may be recognized protuberances of larger dimensions in plan view and of greater height, designated by P1, and protuberances P2, P3 of square and rectangular shape in plan view of smaller height, i.e., projecting less from the roller and thus being located underneath a cylindrical surface on which there lie the top surfaces, herein designated by SA, of the protuberances P1.

The difference in height between the protuberances P1 on the one hand, and the protuberances P2, P3 on the other, can be clearly seen in the schematic cross-sectional view of FIGS. 7A and 8. In this latter figure, it may be noted also how the bottoms of the grooves defining the protuberances are rounded-off, as likewise rounded-off are the top surfaces SA (for the protuberances P1) and SB (for the protuberances P2) with a radiusing between the top surfaces SA, SB themselves and the side faces F of the protuberances. Also in this case, then, sharp edges S1 on the top surfaces of the protuberances are avoided, except for two edges on the protuberances of rectangular shape of smaller height. Theoretically, also in this case the hob could work as in the case of FIG. 6B, hence leaving a part of the top surfaces SA, SB not machined by the profiles of the teeth of the hob. On the other hand, both in this case, as well as in the example previously illustrated of protuberances P all of the same height, it is particularly advantageous to machine the entire surface of the protuberances P, P1, P2, P3 with the hob, thus forming protuberances that are completely rounded on their top surfaces. Alternatively, it is also possible to round off only the protuberances having one of the two heights.

Figure 14:
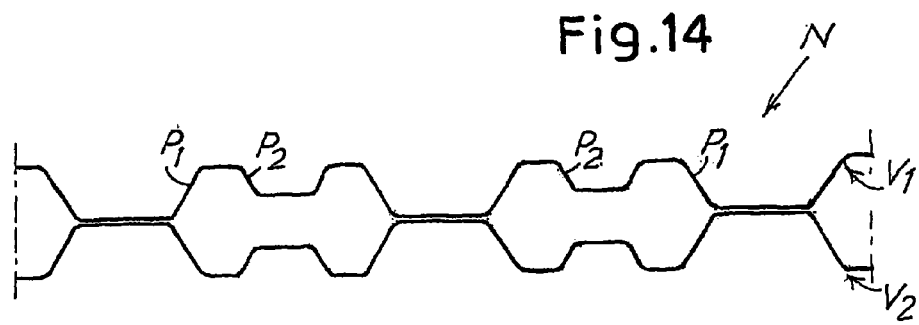
FIGS. 14, 15 and 16 are schematic and markedly enlarged local cross sections of a double-ply weblike material obtained by embossing with rollers according to the present invention, in different configurations and with different types of embossing units.
Figure 15:
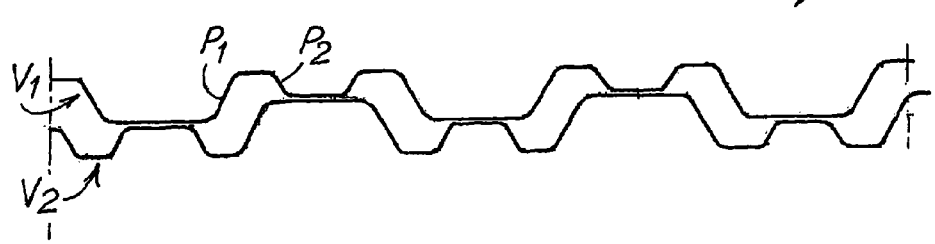
Figure 16:
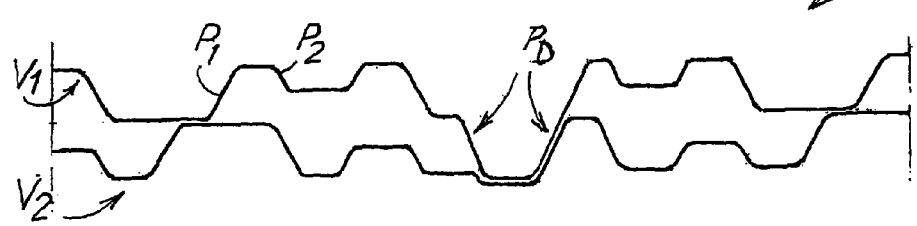

FIGS. 14, 15 and 16 show schematically and with marked enlargement a cross section of a weblike material N obtained by joining (for example by gluing) two plies V1 and V2 of embossed tissue paper, using embossing rollers built according to FIGS. 7, 7A, 8, 12, 13. Shown in FIG. 14 is a material N obtained with the tip-to-tip technique, for example, in an embosser having the configuration described and illustrated in U.S. Pat. No. 5,096,527, the contents of which are integrally incorporated in the present description by reference, but with embossing rollers made with protuberances described above and illustrated in FIGS. 7, 7A, 8, 12, 13. The two layers are embossed separately each between an embossing roller and a pressure roller and are then coupled in a laminating nip between the embossing rollers, which are angularly phased with respect to one another so that the protuberances P1 of the one come to correspond with the protuberances P1 of the other, so that the material N will be made up of plies V1, V2 joined at protuberances of greater height (again designated by P1) of the two plies glued together. A material with large bulk is obtained that will tend not to undergo squeezing, and will hence maintain its original characteristics, thanks to the presence of the protuberances P2 of smaller height and to the high density of protuberances (higher than 5 protuberances/$cm^2$ and preferably higher than 15 protuberances/$cm^2$ and even higher). The protuberances P1, in fact, are so close together that the weblike material will not tend to bend under its own weight or on account of external stresses in the areas containing the protuberances P2, even though the latter are not in contact.

Illustrated in FIG. 15 is a weblike material N that can be obtained with the same type of embossing by phasing differently the embossing rollers so that the higher protuberances P1 of one embossing roller come to correspond to the lower protuberances P2 of the other roller. The plies V1, V2 will in this case be joined in points corresponding to pairs of protuberances P1, P2, and the weblike material N will have an overall volume that is smaller than in the case of FIG. 14. In this case, with respect to the configuration of FIG. 14, it is possible to use also layers of lower substance or lower resistance to bending, in so far as all of the protuberances of one ply come to rest on corresponding protuberances of the other ply.

The same embossing unit provided with embossing rollers thus made is hence able to produce weblike materials of different thickness, i.e., of different volume given the same quantity of material used.

FIG. 16 illustrates a material that can be obtained, for example, with an embossing unit of the type described in U.S. Pat. No. 6,755,928, the contents of which are integrally incorporated in the present description by reference. In an embossing unit of this type either one or the other or both of the two plies V1 and V2 are subjected to a first background embossing, and subsequently at least one of the two layers is subjected to a decorative embossing, with the creation of embossed decorations defined by protuberances of larger dimensions with respect to the protuberances of the background embossing. The embossing rollers that carry out the background embossing of the two plies can be manufactured according to the present invention, thus obtaining a weblike material N of the type illustrated in FIG. 16. The layers V1, V2 each have a background embossing formed by protuberances P1, P2 of different heights, and upon this embossing another is superimposed, designated by PD, which forms the decoration. With the use of embossing rollers according to the present invention products with larger bulk are obtained as compared to traditional systems in so far as the protuberances P1 and P2 that are located between the decorations PD, however they may be coupled together, always maintain a large space between them (for the reasons already illustrated with reference to FIGS. 14 and 15).

Figure 9:
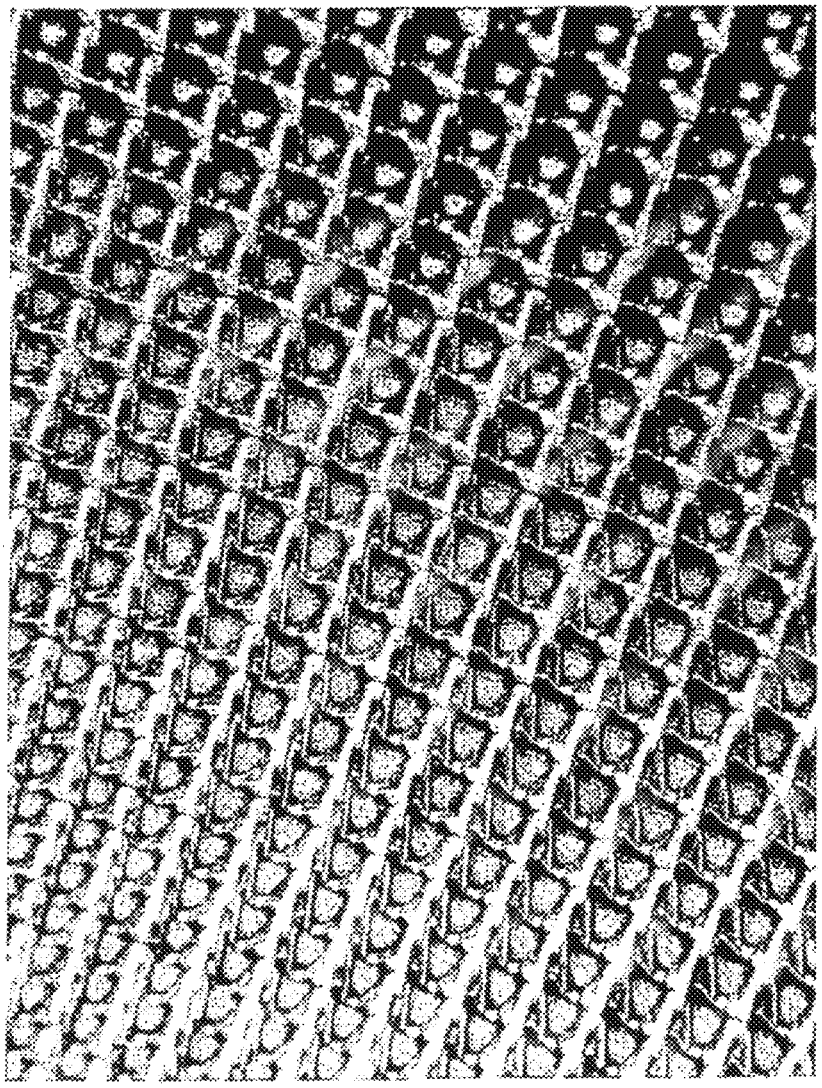
FIG. 9 is a macro-photograph of a portion of roller machined with the method according to the invention.

The result that is obtained with a chip-removal machining according to the invention, especially when the roller is integrally machined over the entire top surface S, SA, SB of the protuberances P, is illustrated in the macrophotograph of FIG. 9. This photograph relates to the situation of the type illustrated in FIGS. 5, 6, 7, with protuberances P all of the same height and with the top surface integrally rounded.

Figure 10:
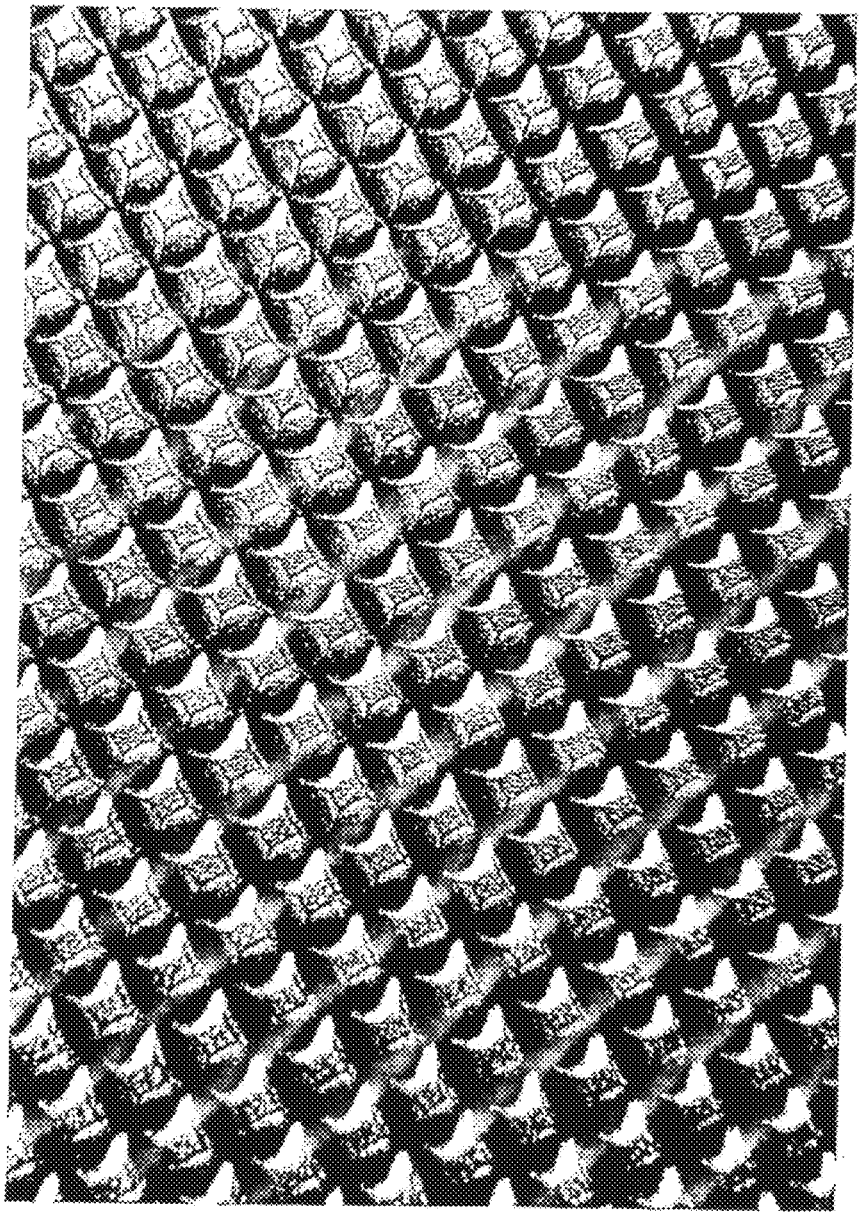
FIG. 10 is a macro-photograph of a roller machined with the traditional technique.

FIG. 10 shows, by comparison, the shape assumed by a roller 1 machined with the traditional technique, with a grinding operation carried out subsequent to incision using the hob, i.e., a roller corresponding to the one represented schematically in FIGS. 1 and 2. There may be clearly noted the presence of a substantially plane top surface with substantially square development in plan view, which is connected with sharp edges to the side faces of the respective protuberance P.

Figure 11:
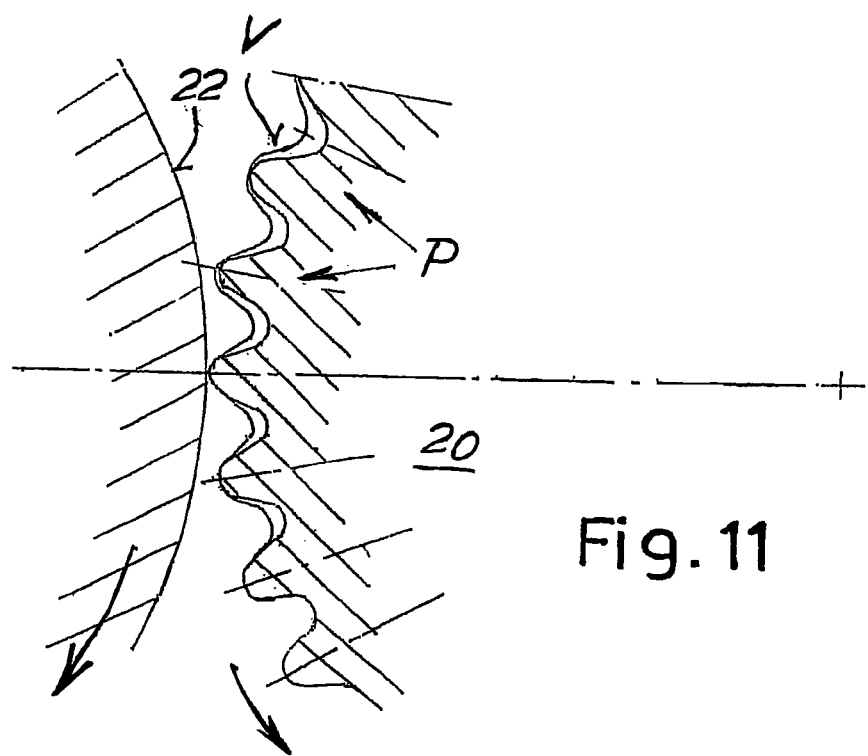
FIG. 11 is a schematic cross section of an embossing roller built according to the invention, with a ply of embossed paper material adherent thereto, in the area in which the ply receives an application of glue.

From a comparison between FIGS. 9 and 10 it is also possible to easily understand the different behaviour of the embossed weblike material when it is brought into contact with an external body, for example a roller for distributing glue coated with a layer of the glue. Using a weblike material embossed with a roller according to FIG. 10, in fact, the top surfaces are quadrangular in shape and are moistened with glue throughout their extension, irrespective of the pressure with which the protuberances and the distributing roller are brought into contact. Instead, in the case of FIG. 9, the protuberances generated on the weblike material do not have an approximately flat top surface, but rather a crowned one. In this case, when the protuberances are brought into contact with the roller for distributing glue, these receive glue only in the central area of each protuberance. This situation is represented schematically in FIG. 11. The embossing roller is designated by 20, and the glue distributing roller is designated by 22, whilst designated by V is the embossed weblike material that is still adherent to the roller 20.

The quantity of distributed glue will, then, be smaller given the same pressure exerted between the protuberances and the distributing roller and will be adjustable according to this pressure.

In the case of weblike material embossed with a roller incised according to the pattern of FIG. 7, only the protuberances of greater height receive the glue, and also in this case the amount of glue distributed is a function of the pressure exerted between the embossed weblike material (supported by the protuberances of the embossing roller) and the roller for distributing glue.

In an embodiment of the invention, the manufacturing method can include a further grinding step performed after machining with the hob, to e.g. flatten the central area of the top surfaces. An embossing roller machined in this way still achieves at least part of the above discussed advantages over the prior art rollers.

In a further embodiment of the invention two rollers obtained as described above can be arranged in an embossing unit and caused to run idly, i.e. without any weblike material. The rollers can be arranged in a tip-to-tip or in a nested configuration. Mutual contact of the rotating rollers can perform an additional machining of the protrusions.

It is understood that the drawing shows just one example, provided merely as a practical demonstration of the invention, which can vary in its forms and arrangements, without on the other hand departing from the scope of the idea underlying the invention. The possible presence of reference numbers in the annexed claims merely has the purpose of facilitating reading of the claims with reference to the description and to the plate of drawings, and in no way limits the scope of protection represented by the claims.

The invention claimed is:

1. A method for manufacturing an embossing roller comprising providing a roller with an axis and a plurality of protuberances arranged according to a geometrical distribution, each of said protuberances being substantially in a shape of a truncated pyramid with a major base closer to the axis of the roller, a top surface further away from the axis of the roller, and planar side surfaces generated by chip removal using a hob, wherein chip-removal machining of top surfaces of the protuberances is completed by said hob in absence of subsequent grinding, and said hob includes teeth with grooves therebetween wherein at least some of the grooves have a profile that is curvilinear in cross-sectional view so that said hob shapes at least some of said top surfaces with rounded edges radiusing to at least some of the planar side surfaces of said protuberances, wherein said protuberances are provided in helically aligned arrangements around the axis of the roller, and wherein said top surfaces are generated via interaction of the roller with said grooves of said hob, each said top surface being generated by chip removal using said hob.

2. The method according to claim 1, wherein said protuberances are generated by at least one first pass and one second pass of the hob on a surface of the roller while said roller is kept in rotation, to generate a first series of helical grooves during said first pass and one second series of helical grooves during said second pass, the helical grooves of the first series and said second series intersecting one another to generate said protuberances.

3. The method according to claim 1, wherein the top surface of each of said protuberances has entirely a convex curved shape.

4. The method according to claim 1, wherein said protuberances are generated in at least two distinct heights on one roller.

5. A method for manufacturing an embossing roller comprising providing a roller with an axis and a plurality of protuberances arranged according to a geometrical distribution, each of said protuberances being substantially in a shape of a truncated pyramid with a major base closer to the axis of the roller, a top surface further away from the axis of the roller, and planar side surfaces generated by chip removal using a hob, wherein chip-removal machining of top surfaces of the protuberances is completed by said hob in absence of subsequent grinding, and said hob includes teeth with grooves therebetween wherein said grooves have a profile that is curvilinear in cross-sectional view so that said hob shapes said top surfaces so that said top surfaces have rounded edges radiusing to all of the planar side surfaces of a corresponding protuberance of said protuberances, wherein said protuberances are provided in helically aligned arrangements around the axis of the roller.

6. A method for manufacturing an embossing roller comprising providing a roller with an axis and a plurality of protuberances arranged according to a geometrical distribution, each of said protuberances being substantially in a shape of a truncated pyramid with a major base closer to the axis of the roller, a top surface further away from the axis of the roller, and planar side surfaces generated by chip removal using a hob, wherein chip-removal machining of top surfaces of the protuberances is completed by said hob in absence of subsequent grinding, and said hob includes teeth with grooves therebetween wherein the grooves have a profile that is curvilinear in cross-sectional view so that said hob shapes said top surfaces so that said top surfaces have a convex shape radiusing to all of the planar side surfaces of a corresponding protuberance of said protuberances via convex curved portions of surfaces, wherein said protuberances are provided in helically aligned arrangements around the axis of the roller.

7. The method according to claim 6, wherein said protuberances are shaped with a convex top surface radiused to all the planar side surfaces via convex curved portions of surfaces.

\* \* \* \* \*